(12) United States Patent
Calvignac et al.

(10) Patent No.: US 8,745,013 B2
(45) Date of Patent: Jun. 3, 2014

(54) COMPUTER INTERFACE SYSTEM

(75) Inventors: Jean L. Calvignac, Raleigh, NC (US);
Casimer M. DeCusatis, Poughkeepsie, NY (US); Fabrice J. Verplanken, LaGaude (FR); Daniel Wind, Drap (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/475,973

(22) Filed: May 19, 2012

(65) Prior Publication Data

US 2013/0311436 A1    Nov. 21, 2013

(51) Int. Cl.
*G06F 17/00* (2006.01)

(52) U.S. Cl.
CPC ....................................... *G06F 17/00* (2013.01)
USPC .......................................... 707/698; 711/216

(58) Field of Classification Search
USPC ............................ 707/697, 698, 747; 711/216
See application file for complete search history.

(56) References Cited

U.S. PATENT DOCUMENTS

| 5,032,987 | A | | 7/1991 | Broder et al. | ........... G06F 15/16 |
| 5,247,620 | A | | 9/1993 | Fukuzawa et al. | ......... G06F 7/02 |
| 5,920,900 | A | * | 7/1999 | Poole et al. | .................... 711/216 |
| 7,370,048 | B2 | | 5/2008 | Loeb | |
| 7,443,321 | B1 | * | 10/2008 | Kaufman et al. | ............... 341/87 |
| 8,397,051 | B2 | * | 3/2013 | Beaman et al. | ............... 711/216 |
| 2007/0083531 | A1 | | 4/2007 | Hussain | |
| 2007/0245119 | A1 | * | 10/2007 | Hoppe | .......................... 711/216 |
| 2007/0286194 | A1 | | 12/2007 | Shavitt et al. | ........... H04L 12/56 |
| 2009/0019345 | A1 | * | 1/2009 | Kaufman et al. | .............. 714/807 |
| 2009/0292721 | A1 | | 11/2009 | Laursen et al. | |
| 2010/0138934 | A1 | * | 6/2010 | Minoshima | ..................... 726/30 |

FOREIGN PATENT DOCUMENTS

| DE | 4023527 | 1/1991 | .............. H04L 12/46 |
| EP | 0948854 B1 | 7/2002 | |
| IT | WO2008049450 A1 | 5/2008 | |

OTHER PUBLICATIONS

Mridul Nandi et al., Multicollision Attacks on Some Generalized Sequential Hash Functions, Feb. 2007, IEEE, 759-767.*
Office Action for German Patent Application 10 2013 208 212.6 dated Nov. 28, 2013.

* cited by examiner

*Primary Examiner* — Jean B Fleurantin
(74) *Attorney, Agent, or Firm* — Steven Chiu (57) ABSTRACT

An improved computer system may include a controller including a computer processor. The system may also include a selector apparatus in communication with the controller to choose a table having a higher collision quality index than other tables under consideration by the selector apparatus. The system may further include an exchanger apparatus to configure a standby table that replaces the table chosen by the selector apparatus. The system may additionally include a switch that changes a hash function based upon the exchanger apparatus' replacement of the chosen table to enable the controller to reduce insertion times and/or collisions when interfacing with new components introduced to the controller.

16 Claims, 10 Drawing Sheets

COMPUTER INTERFACE SYSTEM

BACKGROUND

The invention relates to the field of computer systems, and, more particularly, to an improved computer system for efficient hashing and selection for collision avoidance and minimal insertion time.

An Ethernet port may provide a connection between a computer and a computer network. For a 100 Gbps Ethernet port, the smallest 64 bytes packet duration time is 6.7 nanoseconds, which gives only three clock cycles at 500 Mhz for the logic doing the look up.

SUMMARY

According to one embodiment of the invention, an improved computer system may include a controller including a computer processor. The system may also include a selector apparatus in communication with the controller to choose a table having a higher collision quality index than other tables under consideration by the selector apparatus. The system may further include an exchanger apparatus to configure a standby table that replaces the table chosen by the selector apparatus. The system may additionally include a switch that changes a hash function based upon the exchanger apparatus's replacement of the chosen table to enable the controller to reduce insertion times and/or collisions when interfacing with new components introduced to the controller.

The selector apparatus may determine the collision quality index for the tables under consideration based upon placement of keys within the tables under consideration. The distribution of the keys may be monitored as an indication of hash function efficiency.

The exchanger apparatus may lower the collision quality index by replacing the table chosen by the selector apparatus. The exchanger apparatus may configure the standby table by using a new hash function and/or duplicating the entries of the table having a higher collision quality index than other tables under consideration by the selector apparatus.

The exchanger apparatus may complete the standby table configuration near when an overflow threshold is reached. The overflow threshold may be based upon a lengthy insertion time.

The insertion time may be calculated by counting a number of insertions for which a defined number of collisions have been resolved. The hash function may comprise a linear key distribution.

Another aspect of the invention is a method for improving a computer system. The method may include choosing a table having a higher collision quality index than other tables under consideration by a selector apparatus in communication with a controller. The method may also include configuring with an exchanger apparatus a standby table to replace the table chosen by the selector apparatus. The method may further include changing with a switch a hash function based upon the exchanger apparatus's replacement of the chosen table to enable the controller to reduce insertion times and/or collisions when interfacing with new components introduced to the controller.

The method may additionally include determining by the selector apparatus the collision quality index for the tables under consideration based upon placement of keys within the tables under consideration. The method may also include monitoring distribution of the keys as an indication of hash function efficiency.

The method may further include lowering by the exchanger apparatus the collision quality index by replacing the table chosen by the selector apparatus. The method may additionally include configuring by the exchanger apparatus the standby table by using a new hash function and/or duplicating the entries of the table having a higher collision quality index than other tables under consideration by the selector apparatus. The method may also include completing by the exchanger apparatus the standby table configuration near when an overflow threshold is reached.

Another aspect of the invention is computer readable program codes coupled to tangible media to improve a computer system. The computer readable program codes may be configured to cause the program to choose a table having a higher collision quality index than other tables under consideration by a selector apparatus in communication with a controller. The computer readable program codes may also configure with an exchanger apparatus a standby table to replace the table chosen by the selector apparatus. The computer readable program codes may further provide change with a switch a hash function based upon the exchanger apparatus's replacement of the chosen table to enable the controller to reduce insertion times and/or collisions when interfacing with new components introduced to the controller.

The computer readable program codes may additionally determine by the selector apparatus the collision quality index for the tables under consideration based upon placement of keys within the tables under consideration. The computer readable program codes may also monitor distribution of the keys as an indication of hash function efficiency.

The computer readable program codes may also lower by the exchanger apparatus the collision quality index by replacing the table chosen by the selector apparatus. The computer readable program codes may further configure by the exchanger apparatus the standby table by using a new hash function and/or duplicating the entries of the table having a higher collision quality index than other tables under consideration by the selector apparatus. The computer readable program codes may additionally complete by the exchanger apparatus the standby table configuration near when an overflow threshold is reached.

DETAILED DESCRIPTION

The invention will now be described more fully hereinafter with reference to the accompanying drawings, in which preferred embodiments of the invention are shown. Like numbers refer to like elements throughout, and like numbers with letter suffixes are used to identify similar parts in a single embodiment.

Figure 1:
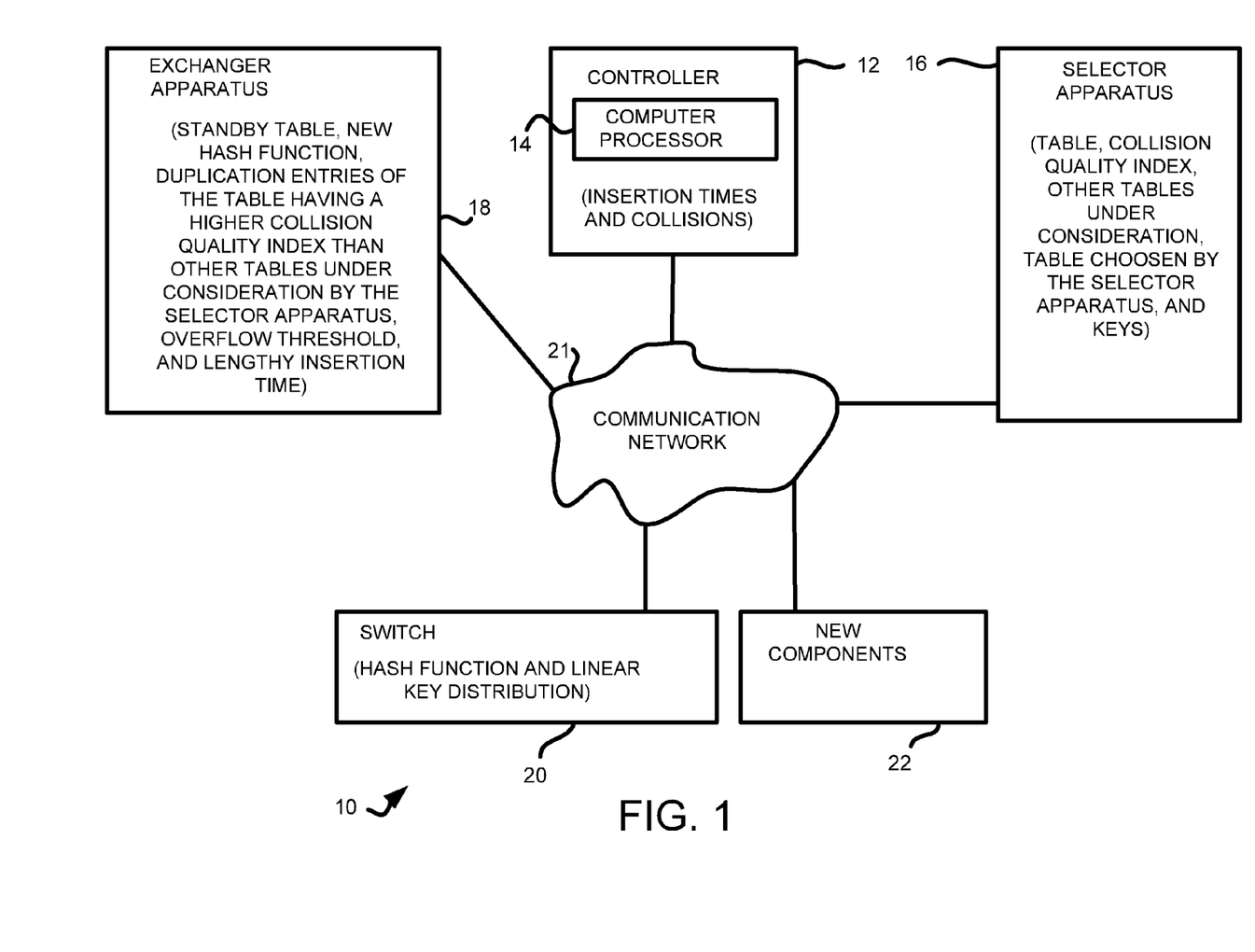
FIG. 1 is a block diagram illustrating a database improvement system in accordance with the invention.

With reference now to FIG. 1, an improved computer system 10 is initially described. In an embodiment, the system 10 includes a controller 12 comprising a computer processor 14. The system 10 also includes a selector apparatus 16 in communication with the controller 12 to choose a table having a higher collision quality index than other tables under consideration by the selector apparatus. The system 10 further includes an exchanger apparatus 18 to configure a standby table that replaces the table chosen by the selector apparatus 16. The system 10 additionally includes a switch 20 that changes a hash function based upon the exchanger apparatus's 18 replacement of the chosen table to enable the controller 12 to reduce insertion times and/or collisions when interfacing with new components 22 introduced to the controller. The components of system 10 are connected by a communications network 21 as will be appreciated by those of skill in the art.

In one embodiment, the selector apparatus 16 determines the collision quality index for the tables under consideration based upon placement of keys within the tables under consideration. In another embodiment, the distribution of the keys may be monitored as an indication of hash function efficiency.

In one embodiment, the exchanger apparatus 18 lowers the collision quality index by replacing the table chosen by the selector apparatus 16. In another embodiment, the exchanger apparatus 18 configures the standby table by using a new hash function and/or duplicating the entries of the table having a higher collision quality index than other tables under consideration by the selector apparatus 16.

In one embodiment, the exchanger apparatus 18 completes the standby table configuration near when an overflow threshold is reached. In another embodiment, the overflow threshold is based upon a lengthy insertion time.

In one embodiment, the insertion time is calculated by counting a number of insertions for which a defined number of collisions have been resolved. In another embodiment, the hash function comprises a linear key distribution.

Figure 2:
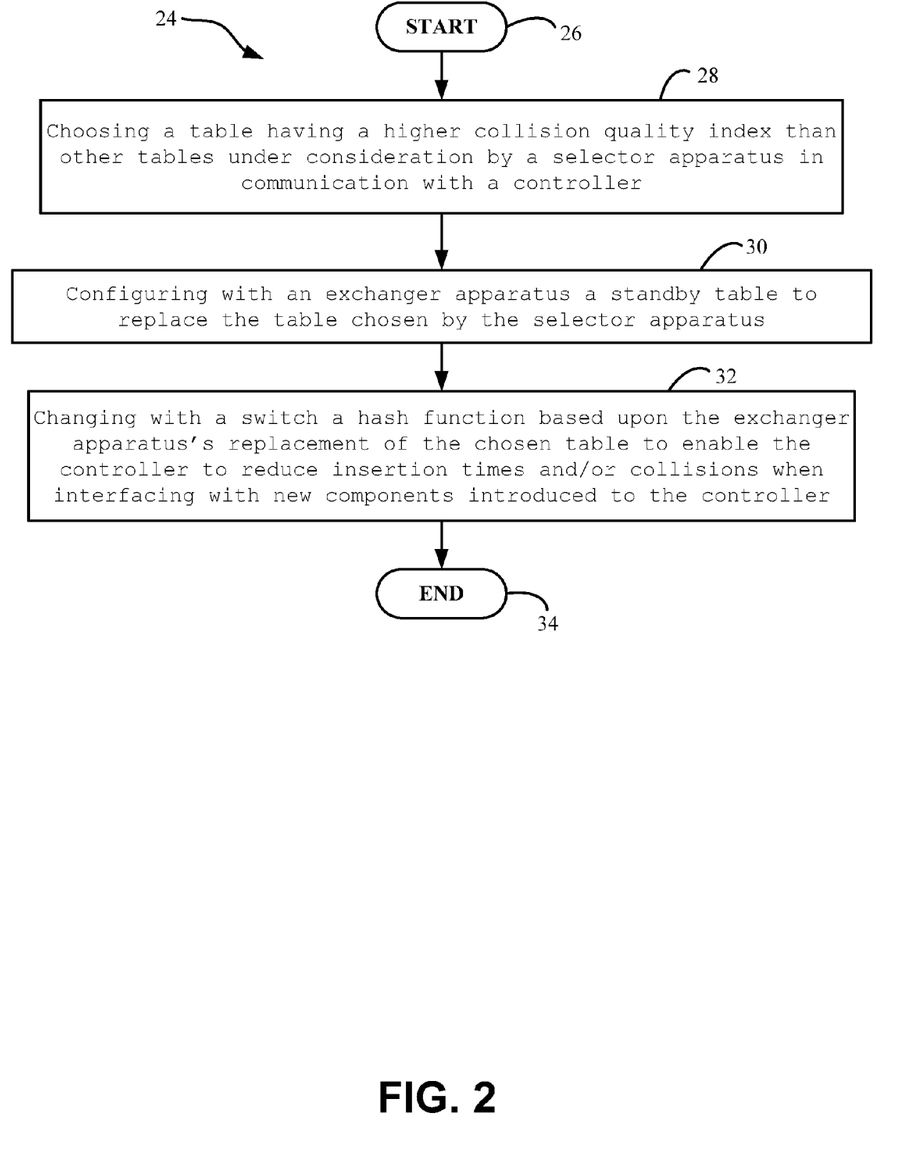
FIG. 2 is a flowchart illustrating method aspects according to the invention.

Another aspect is a method to improve a computer system, which is now described with reference to flowchart 24 of FIG. 2. The method begins at Block 26 and may include choosing a table having a higher collision quality index than other tables under consideration by a selector apparatus in communication with a controller at Block 28. The method may also include configuring with an exchanger apparatus a standby table to replace the table chosen by the selector apparatus at Block 30. The method may further include changing with a switch a hash function based upon the exchanger apparatus's replacement of the chosen table to enable the controller to reduce insertion times and/or collisions when interfacing with new components introduced to the controller at Block 32. The method ends at Block 34.

Figure 3:
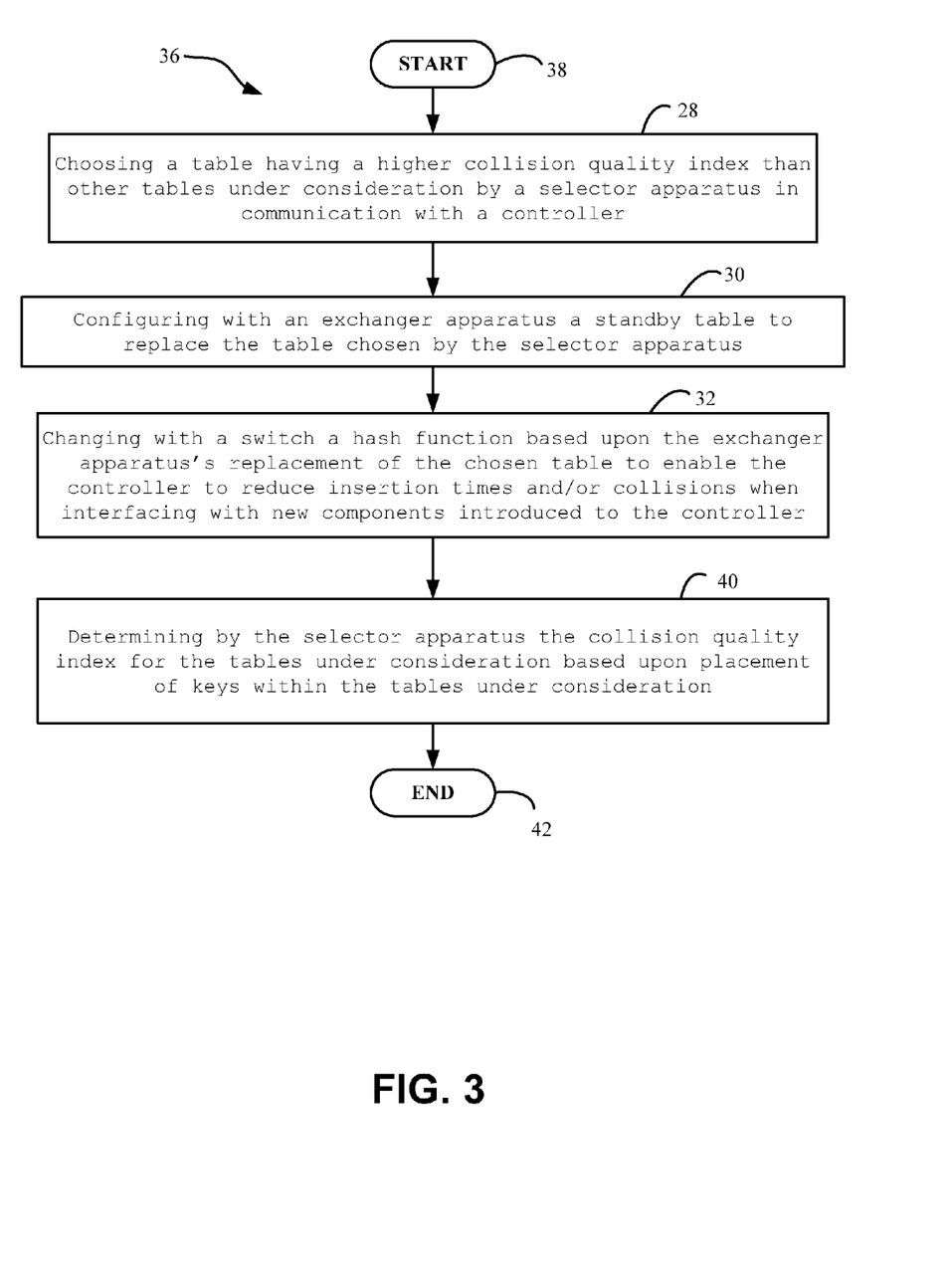
FIG. 3 is a flowchart illustrating method aspects according to the method of FIG. 2.

In another method embodiment, which is now described with reference to flowchart 36 of FIG. 3, the method begins at Block 38. The method may include the steps of FIG. 2 at Blocks 28, 30, and 32. The method may additionally include determining by the selector apparatus the collision quality index for the tables under consideration based upon placement of keys within the tables under consideration at Block 40. The method ends at Block 42.

Figure 4:
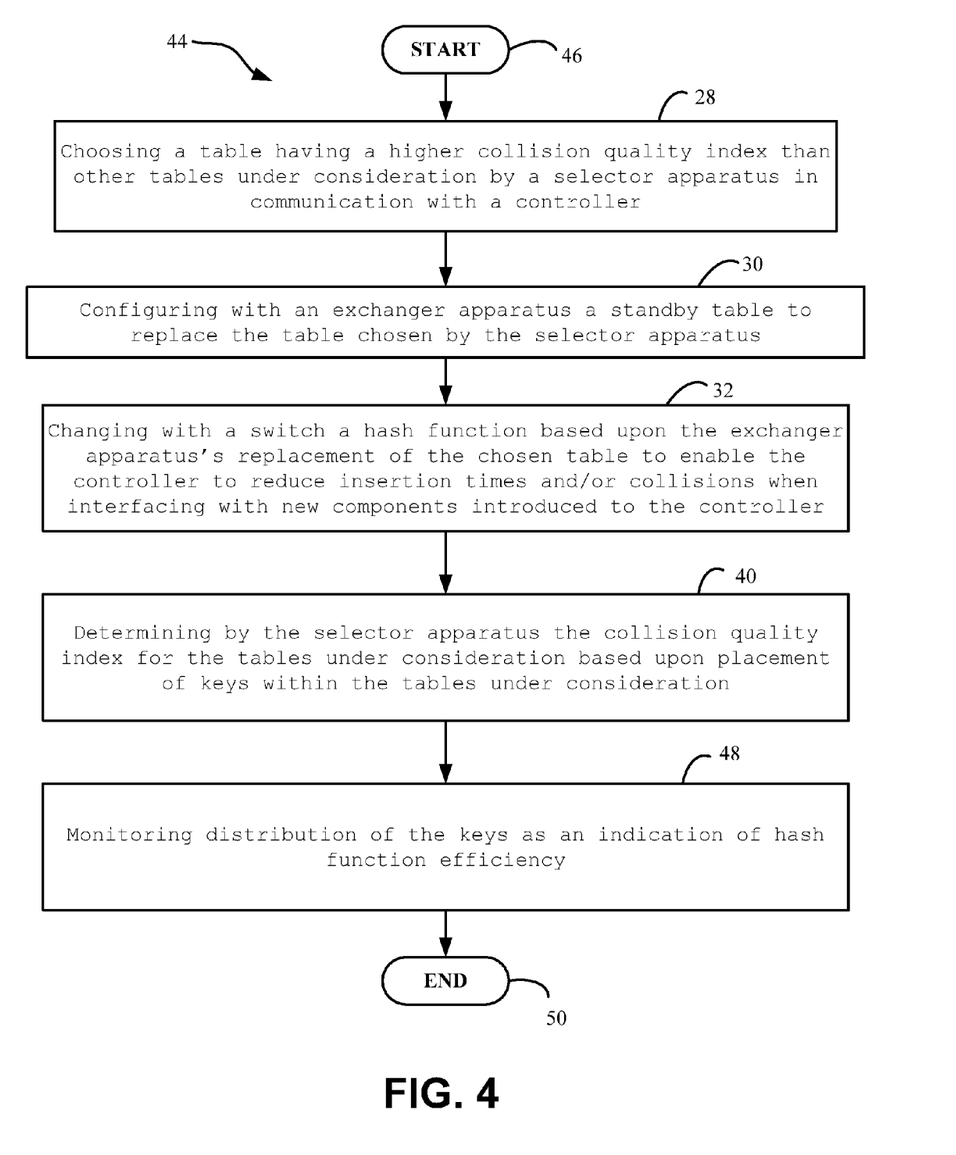
FIG. 4 is a flowchart illustrating method aspects according to the method of FIG. 3.

In another method embodiment, which is now described with reference to flowchart 44 of FIG. 4, the method begins at Block 46. The method may include the steps of FIG. 3 at Blocks 28, 30, 32, and 40. The method may also include monitoring distribution of the keys as an indication of hash function efficiency at Block 48. The method ends at Block 50.

Figure 5:
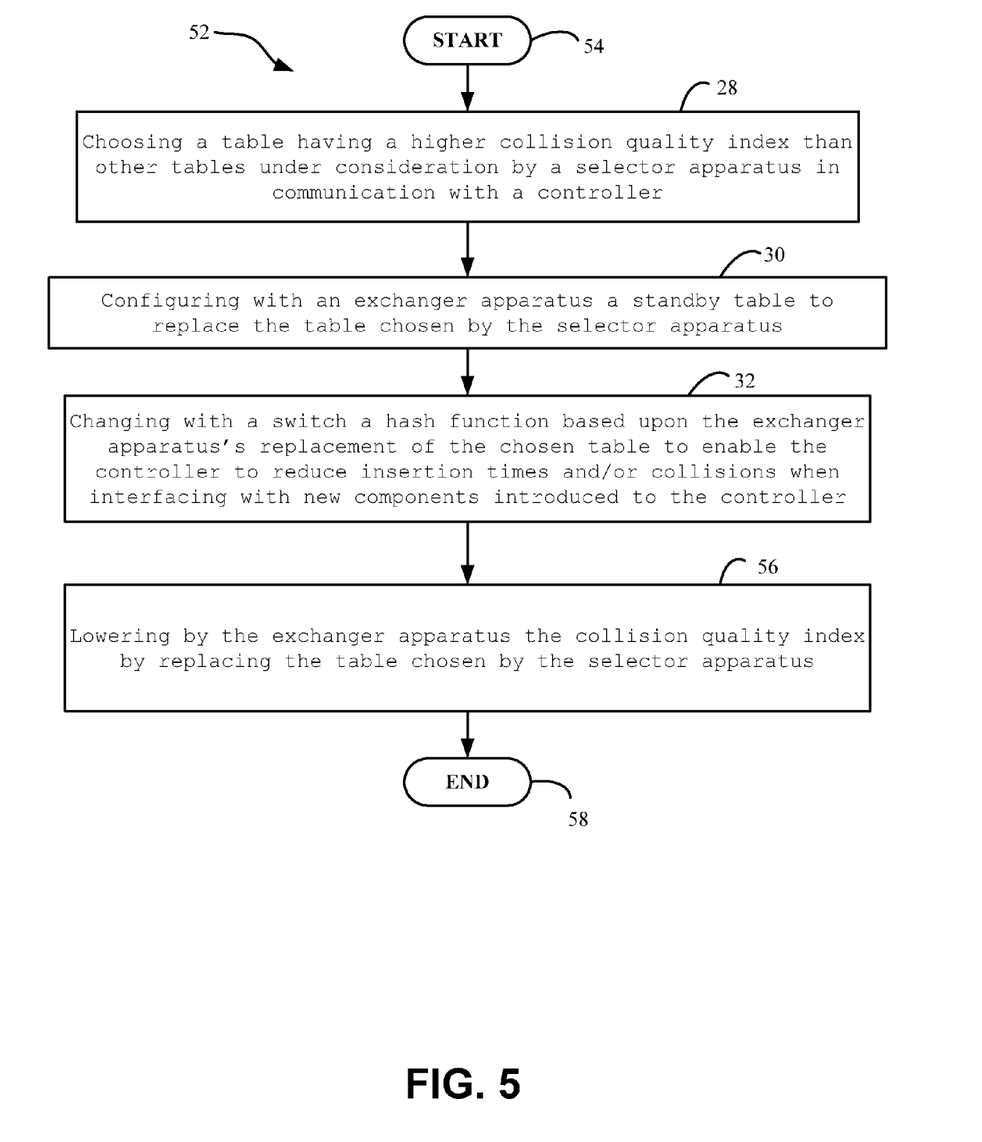
FIG. 5 is a flowchart illustrating method aspects according to the method of FIG. 2.

In another method embodiment, which is now described with reference to flowchart 52 of FIG. 5, the method begins at Block 54. The method may include the steps of FIG. 2 at Blocks 28, 30, and 32. The method may further include lowering by the exchanger apparatus the collision quality index by replacing the table chosen by the selector apparatus at Block 56. The method ends at Block 58.

Figure 6:
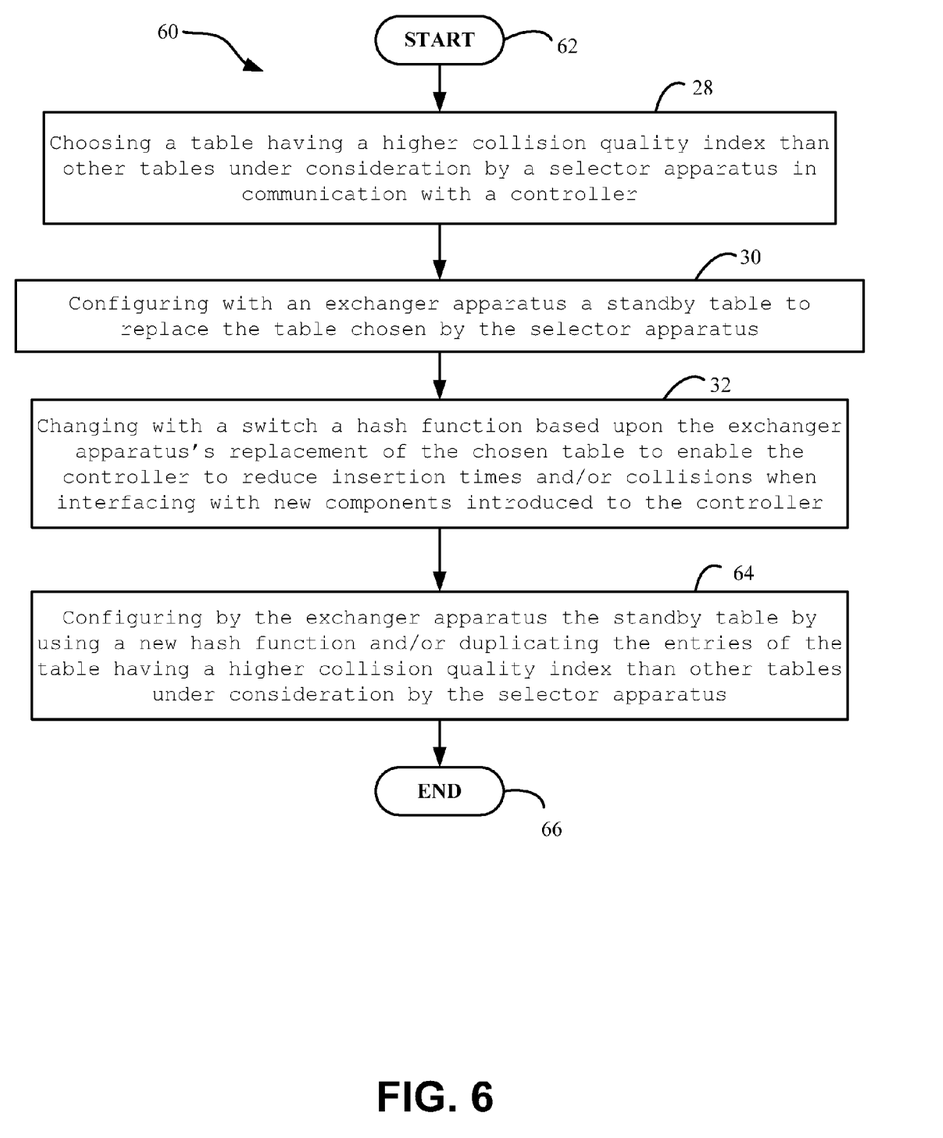
FIG. 6 is a flowchart illustrating method aspects according to the method of FIG. 2.

In another method embodiment, which is now described with reference to flowchart 60 of FIG. 6, the method begins at Block 62. The method may include the steps of FIG. 2 at Blocks 28, 30, and 32. The method may additionally include configuring by the exchanger apparatus the standby table by using a new hash function and/or duplicating the entries of the table having a higher collision quality index than other tables under consideration by the selector apparatus at Block 64. The method ends at Block 66.

Figure 7:
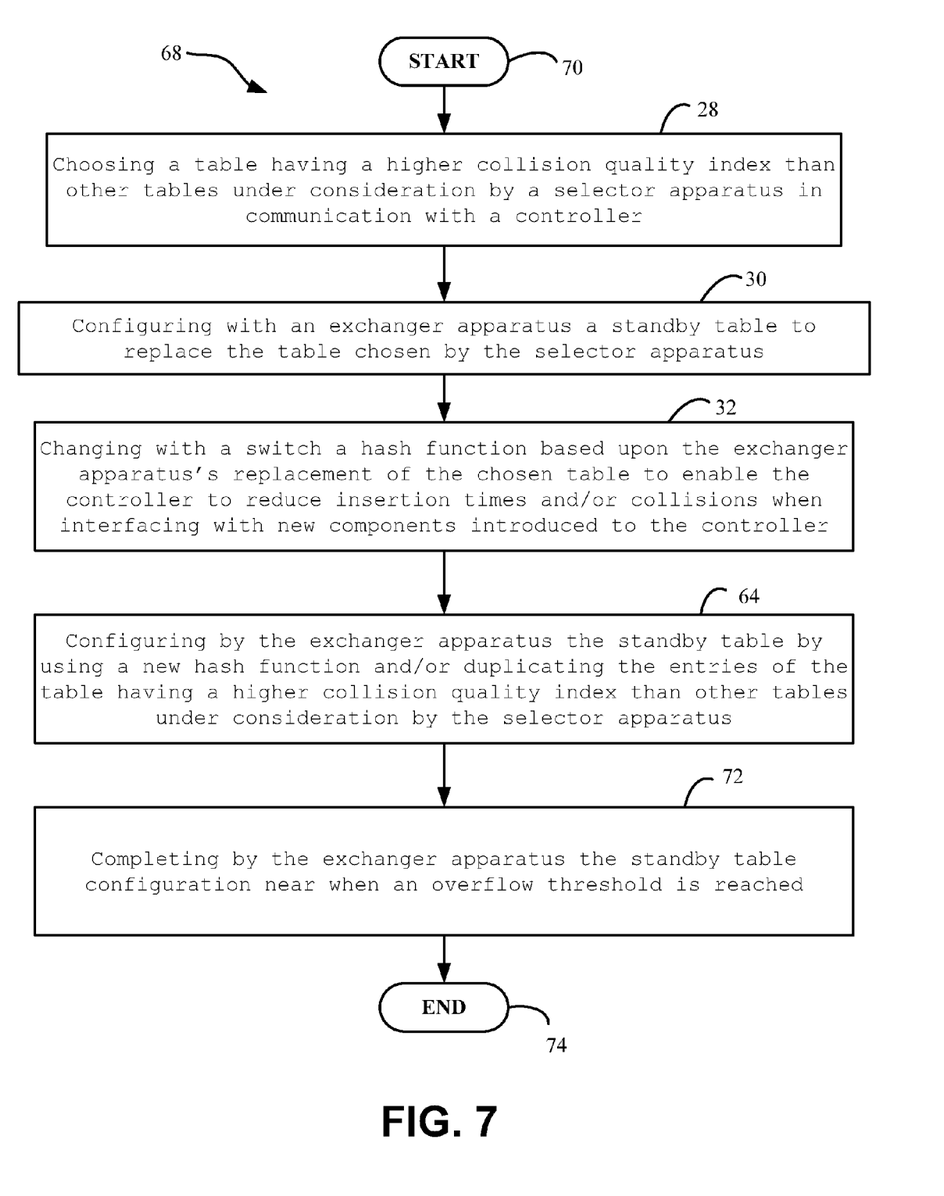
FIG. 7 is a flowchart illustrating method aspects according to the method of FIG. 6.

In another method embodiment, which is now described with reference to flowchart 68 of FIG. 7, the method begins at Block 70. The method may include the steps of FIG. 6 at Blocks 28, 30, 32, and 64. The method may also include completing by the exchanger apparatus the standby table configuration near when an overflow threshold is reached at Block 72. The method ends at Block 74.

Another aspect of the invention is computer readable program codes coupled to tangible media to improve a computer system 10. The computer readable program codes may be configured to cause the program to choose a table having a higher collision quality index than other tables under consideration by a selector apparatus 16 in communication with a controller 12. The computer readable program codes may also configure with an exchanger apparatus 18 a standby table to replace the table chosen by the selector apparatus 16. The computer readable program codes may further provide change through a switch 20 of a hash function based upon the exchanger apparatus's 18 replacement of the chosen table to enable the controller 12 to reduce insertion times and/or collisions when interfacing with new components 22 introduced to the controller.

The computer readable program codes may additionally determine by the selector apparatus 16 the collision quality index for the tables under consideration based upon placement of keys within the tables under consideration. The computer readable program codes may also monitor distribution of the keys as an indication of hash function efficiency.

The computer readable program codes may also lower by the exchanger apparatus 18 the collision quality index by replacing the table chosen by the selector apparatus 16. The computer readable program codes may further configure by the exchanger apparatus 18 the standby table by using a new hash function and/or duplicating the entries of the table having a higher collision quality index than other tables under consideration by the selector apparatus 16. The computer readable program codes may additionally complete by the exchanger apparatus 18 the standby table configuration near when an overflow threshold is reached.

In view of the foregoing, the system 10 provides an improved computer system. For example, using conventional hashing with chaining such as the "Cuckoo Algorithm" can do a search in a few bonded number of table lookups when used in a 100 Gbps Ethernet application, but its drawback is a long insertion time when a lot of hashing collisions are present in a very large table. In contrast, system 10 enables insertion in the same time range as a search, which is important when new table insertion are done on the fly by packet learning in a plug and play network.

System 10 uses efficient hashing and/or algorithm selection for collision avoidance and reduced insertion time. System 10 uses a method for measuring the collision quality index and then switching to a new table polynomial that will reduce or minimize this index.

System 10 reduces insertion time by minimizing collision using a lookup mechanism with multiple hasher/tables based on incremental replacement of the less efficient table following three steps. First, measurement to find the less efficient table. Second, configuration of the optimal standby hasher and preparation of the corresponding standby table. And thirdly, on the fly replacement of the less efficient table by the standby table.

When insertions take too long (Overflow limit reached) the less efficient table is replaced by a new one.

This is done without having to re-hash the entries in the three other tables like done in classical Cuckoo algorithm solutions.

The insertion into tables is such that a collision quality index can be calculated for each table. The entries of the less efficient tables are duplicated in the 5th table with a new hasher configuration (and this can be done in the background to test different hashers).

If an entry cannot be placed in this 5th table, it is not installed yet into the three other tables (but simply recorded to get an idea of the efficiency of the new hasher). When the overflow is reached, the transfer of the entries of the less efficient table into the 5th table is done (with installation in the three other tables if such cannot be in the 5th table). System 10 issues an atomic operation to the hardware to switch to the new lookup tables.

System 10 provides a collision quality index measurement. The insertion into the tables is such that a collision quality index can be calculated for each table.

System 10 hashes a new key with N hash functions (N=Number of table) during the insertion process. System 10 does the insertion into a bucket that has the most empty entries. System 10 keeps track of the number of empty buckets per table. As a result, the preceding provides that all the tables have about the same load. And, when overflow is detected, the less efficient table is the one which has the most empty buckets.

Figure 8:
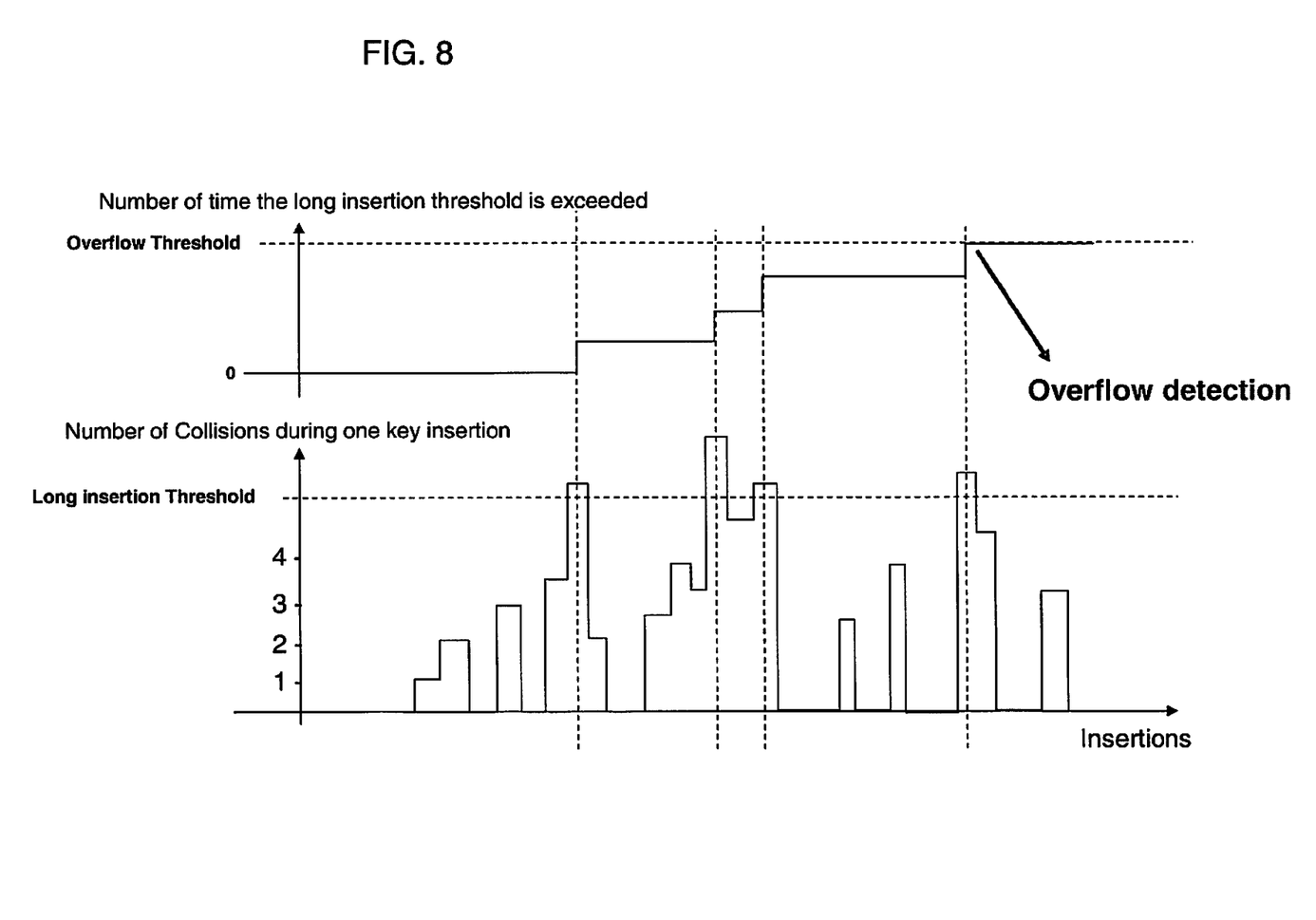
FIG. 8 is a chart illustrating insertion thresholds in accordance with the invention.

With additional reference to FIG. 8, in one embodiment, overflow is detected when the insertion time becomes too long. This is achieved by counting the number of insertions for which a defined number of collisions have been resolved (long insertion threshold). When this count reaches a defined threshold, overflow is detected. At this point, the less efficient table should be replaced.

System 10 can define the most appropriate hash function. If after a while, overflow is reached, this is likely due to a significant change in keys distribution.

System 10 measures the key entropy and reacts properly to such. Initial state would be that hash functions are optimized for a linear keys distribution. Then, when overflow is detected, system 10 configures a new hash function, e.g. XOR matrix, such that the hash function sees a linear distribution.

Figure 9:
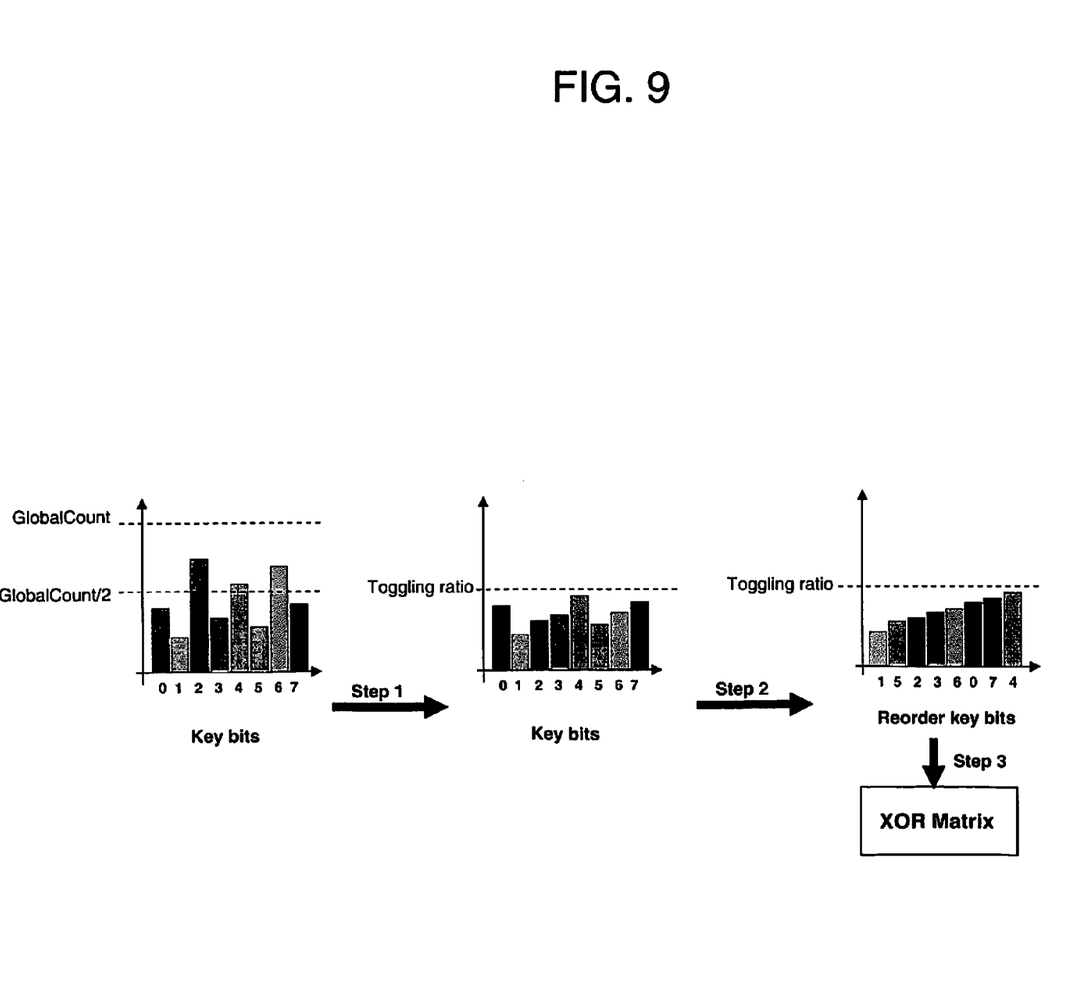
FIG. 9 is a series of charts illustrating an exemplary key bit reordering process in accordance with the invention.

With additional reference to FIG. 9, system 10 provides a key distribution measurement. In one embodiment, system 10 uses 64 counters (one per key bit)+one global counter. At each insertion, system 10: increments the global counter; for each key bit does, if (bit=1), then increment counter[bit]; and at each key removal does decrement the global counter and for each key bit does, if (bit=1), then decrement counter[bit].

System 10 also provides new algorithm selection. In one embodiment, system 10 computes a toggling ratio for each bit, and if counter[bit]/GlobalCount/2, then counter[bit]=(GlobalCount/2)−(Count[i]−GlobalCount/2). System 10 can also reorder the bits from less toggling bit to most toggling bit to get back to a linear key distribution. System 10 also can reconfigure the XOR Matrix to select bits taking into account reordering. In another embodiment, system 10 uses a counter per byte scheme instead of a counter per bit scheme.

Figure 10:
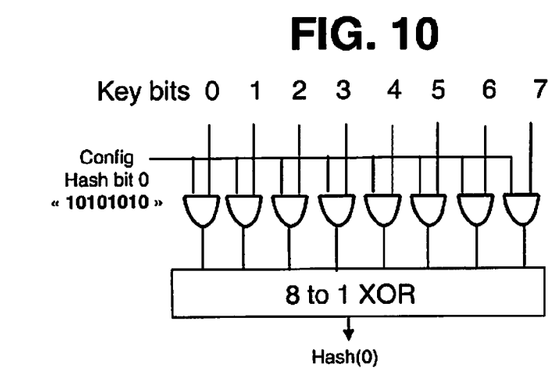
FIGS. 10 and 11 are diagrams illustrating hashers using linear key distribution in accordance with the invention.
Figure 11:
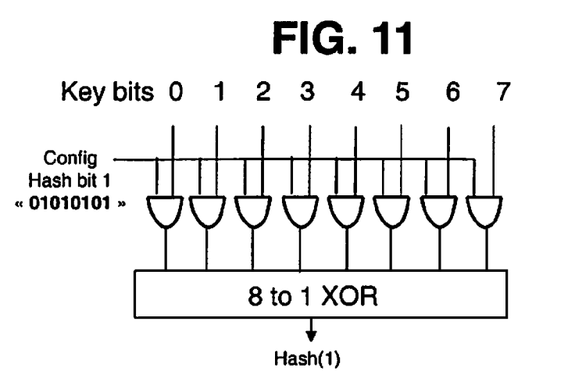

With additional reference to FIGS. 10-14 where FIGS. 10 and 11 are an example of an XOR Matrix re-configuration (8b key to 2b hash). Assume this initial hasher configuration is optimized for linear keys distribution.

Figure 12:
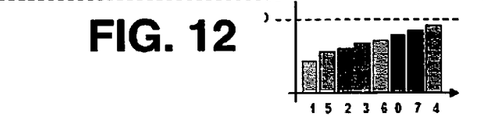
FIG. 12 illustrates reconfiguration with bits reordering in accordance with the invention.
Figure 13:
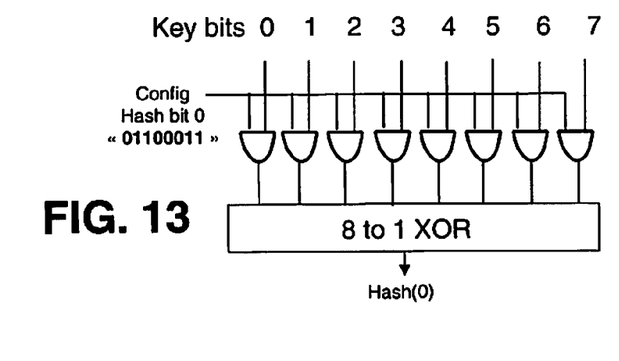
FIGS. 13 and 14 are diagrams illustrating reconfigured hashers with the performance similar to a linear key distribution in accordance with the invention.
Figure 14:
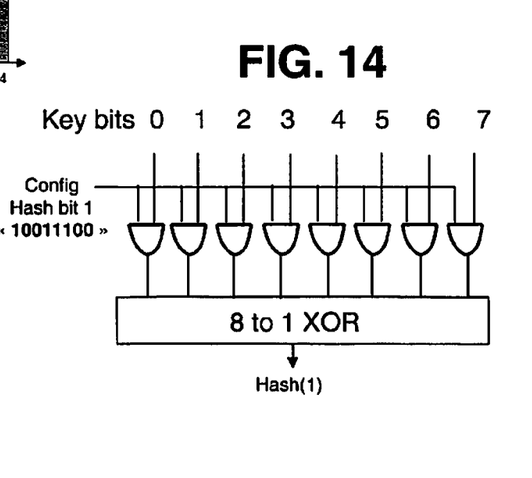

FIG. 12 illustrates re-configuration with bits re-ordering. And, FIGS. 13 and 14 illustrate the re-configured hasher has the same performance as if the keys distribution was linear.

In one embodiment, system 10 provides a method for executing a single hash function in hardware for mapping one of hundreds of millions of keys to a slot in one of a plurality of tables. The method includes determining a collision quality index for each one of the plurality of tables and selecting the table that has the highest collision quality index. The method also includes configuring a standby table and replacing the table having the highest collision quality index with the standby table thereby reducing the collision quality index for the table. The method further includes notifying a switch management element that the table with the highest collision quality index was replaced by the standby table which will thereby utilize a new hash function.

In one embodiment, system 10 uses a specific insertion algorithm based on trying to put the same number of keys in each table=fair distribution of keys in multiple tables. In another embodiment, system 10 uses as a way to measure the collision quality index a percent of buckets not touched and/or the loading rate of the table (good spraying).

In one embodiment, if the key distribution is linear, system 10 knows how to select different cyclic redundancy check (CRC) polynomials with good avalanche and that are orthogonal to each other. If, after a while, hasher performance is degraded, this is due to significant change in keys distribution. Therefore, the idea is to measure the key entropy and reorder the bits such that they look like linear distribution when entering the XOR matrix.

System 10 determines a better standby hasher. In one embodiment, system 10 provides continuous measurement of the keys' entropy (each bit of the keys installed). This uses one counter per bit and one global counter.

For the key insertion process: Increment global counter, For each key bit does: if (bit=1) then increment counter[bit].

And for the key removal process: Decrement global counter. For each key bit does: if (bit=1) then decrement counter[bit].

System 10 reorders the key bits in front of XOR matrix such that CRC polynomial generates a good avalanche pattern.

System 10 prepares the standby table. The entries of the less efficient tables are duplicated in the 5th table with a new hasher configuration (and this can be done in background testing different hashers). If an entry cannot be placed in this 5th table, it is not installed yet in the three other tables (but simply recorded in a back-up repository to get an idea of the efficiency of the new hasher).

System 10 provides a switchover. When the overflow is reached, the transfer of the entries of the less efficient table into the 5th table is done (with installation into the three other tables if cannot be in the 5th table). System 10 issues an atomic operation to the hardware to switch to the new lookup tables.

In one embodiment, system 10 discloses configuring a standby hash table with a hash function optimized for linear distribution of hash values and replacing a less efficient hash table with the standby hash table.

It should be noted that in some alternative implementations, the functions noted in a flowchart block may occur out of the order noted in the figures. For instance, two blocks shown in succession may, in fact, be executed substantially concurrently, or the blocks may sometimes be executed in the reverse order, depending upon the functionality involved because the flow diagrams depicted herein are just examples. There may be many variations to these diagrams or the steps (or operations) described therein without departing from the spirit of the invention. For example, the steps may be performed concurrently and/or in a different order, or steps may be added, deleted, and/or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
a controller including a computer processor;
a selector apparatus in communication with the controller to choose a table having a higher collision quality index than other tables under consideration by the selector apparatus;
an exchanger apparatus to configure a standby table that replaces the table chosen by the selector apparatus; and
a switch that changes a hash function based upon the exchanger apparatus's replacement of the chosen table to enable the controller to reduce at least one of insertion times and collisions when interfacing with new components introduced to the controller; and
wherein the exchanger apparatus completes a standby table configuration near when an overflow threshold is reached;
wherein the overflow threshold is based upon an insertion time;
wherein the insertion time is calculated by counting a number of insertions for which a defined number of collisions have been resolved.

2. The system of claim 1 wherein the selector apparatus determines the collision quality index for the tables under consideration based upon placement of keys within the tables under consideration.

3. The system of claim 2 wherein distribution of the keys is monitored as an indication of hash function efficiency.

4. The system of claim 1 wherein the exchanger apparatus lowers the collision quality index by replacing the table chosen by the selector apparatus.

5. The system of claim 1 wherein the exchanger apparatus configures the standby table by at least one of using a new hash function, and duplicating the entries of the table having a higher collision quality index than other tables under consideration by the selector apparatus.

6. The system of claim 1 wherein the hash function comprises a linear key distribution.

7. A method comprising:
choosing by a computer processor a table having a higher collision quality index than other tables under consideration by a selector apparatus in communication with a controller;
configuring with an exchanger apparatus a standby table to replace the table chosen by the selector apparatus; and
changing with a switch a hash function based upon the exchanger apparatus's replacement of the chosen table to enable the controller to reduce at least one of insertion times and collisions when interfacing with new components introduced to the controller; and
wherein configuring with the exchanger apparatus includes completing a standby table configuration near when an overflow threshold is reached;
wherein the overflow threshold is based upon an insertion time;
wherein the insertion time is calculated by counting a number of insertions for which a defined number of collision have been resolved.

8. The method of claim 7 further comprising determining by the selector apparatus the collision quality index for the tables under consideration based upon placement of keys within the tables under consideration.

9. The method of claim 8 further comprising monitoring distribution of the keys as an indication of hash function efficiency.

10. The method of claim 7 further comprising lowering by the exchanger apparatus the collision quality index by replacing the table chosen by the selector apparatus.

11. The method of claim 7 further comprising configuring by the exchanger apparatus the standby table by at least one of using a new hash function, and duplicating the entries of the table having a higher collision quality index than other tables under consideration by the selector apparatus.

12. A non-transitory computer program product embodied in a tangible media comprising: computer readable program codes coupled to the tangible media to improve computer systems, the computer readable program codes configured to cause the program to:

choose a table having a higher collision quality index than other tables under consideration by a selector apparatus in communication with a controller;

configure with an exchanger apparatus a standby table to replace the table chosen by the selector apparatus; and change with a switch a hash function based upon the exchanger apparatus's replacement of the chosen table to enable the controller to reduce at least one of insertion times and collisions when interfacing with new components introduced to the controller; and wherein configuring with the exchanger apparatus includes completing a standby table configuration near when an overflow threshold is reached;

wherein the overflow threshold is based upon an insertion time;

wherein the insertion time is calculated by counting a number of insertions for which a defined number of collision have been resolved.

13. The computer program product of claim 12 further comprising program code configured to: determine by the selector apparatus the collision quality index for the tables under consideration based upon placement of keys within the tables under consideration.

14. The computer program product of claim 13 further comprising program code configured to: monitor distribution of the keys as an indication of hash function efficiency.

15. The computer program product of claim 12 further comprising program code configured to: lower by the exchanger apparatus the collision quality index by replacing the table chosen by the selector apparatus.

16. The computer program product of claim 12 further comprising program code configured to: configure by the exchanger apparatus the standby table by at least one of using a new hash function, and duplicating the entries of the table having a higher collision quality index than other tables under consideration by the selector apparatus.

* * * * *